United States Patent [19]

Fukumoto et al.

[11] Patent Number: 4,702,988
[45] Date of Patent: Oct. 27, 1987

[54] PROCESS FOR PRODUCING TONER FOR DEVELOPING ELECTROSTATIC IMAGES

[75] Inventors: Hiroshi Fukumoto, Kawasaki; Toshikazu Ohnishi; Kohzoh Arahara, both of Tokyo, all of Japan

[73] Assignee: Canon Kabushiki Kaisha, Tokyo, Japan

[21] Appl. No.: 18,535

[22] Filed: Feb. 25, 1987

[30] Foreign Application Priority Data

Mar. 3, 1986 [JP] Japan .................................. 61-45917

[51] Int. Cl.$^4$ .............................................. G03G 9/12
[52] U.S. Cl. ..................................... 430/137; 260/695
[58] Field of Search .......................................... 430/137

[56] References Cited

U.S. PATENT DOCUMENTS

4,259,465  3/1981  Barabas ............................... 526/212

Primary Examiner—J. David Welsh
Attorney, Agent, or Firm—Fitzpatrick, Cella, Harper & Scinto

[57] ABSTRACT

A toner for developing electrostatic latent images is produced by a process comprising the steps of: (a) preliminarily dispersing a monomer composition comprising at least a polymerizable monomer and a colorant in a liquid dispersion medium which is substantially mutually-insoluble with the monomer and contains a fine powdery dispersion stabilizer, thereby to form a liquid dispersion containing the preliminarily dispersed monomer composition; (b) pressurizing the liquid dispersion up to a pressure of 10 kg/cm$^2$ or above; (c) ejecting the dispersion into a low pressure section to form particles of the monomer composition; and (d) subjecting the particles of the monomer composition to suspension polymerization, thereby to produce toner particles.

24 Claims, 5 Drawing Figures

PROCESS FOR PRODUCING TONER FOR DEVELOPING ELECTROSTATIC IMAGES

FIELD OF THE INVENTION AND RELATED ART

The present invention relates to a process for producing a toner for developing electrostatic or electrostatically charged images in image forming process such as electrophotography, electrostatography and electrostatic printing, and more particularly to a process for producing a toner for developing electrostatic images through suspension polymerization including a step of granulation or droplet formation for effectively forming particles (droplets) with a sharp particle size distribution.

The methods of developing electrostatic images formed on recording media used heretofore in electrophotography, electrostatic recording and electrostatic printing, may roughly include the liquid developing method using a developer comprising an insulating liquid and a various pigment or dye dispersed therein; and the dry developing method such as the cascade method, the fur brush method, the magnetic brush method, the impression method, and the powder cloud method respectively using fine particles called "toner" comprising a colorant such as carbon black dispersed in natural or synthetic polymers or waxes. The above mentioned liquid developing method involves problems that the treatment of the developer is troublesome and undesirable odor occurs during development and fixation, and even thereafter. For this reason, the above mentioned dry developing method is frequently used.

The toner for developing electrostatic images is generally produced by mixing a binder such as a vinyl polymer such as polystyrene or polyacrylic acid ester, epoxy polymer, petroleum polymer or ester condensate; and a colorant such as dye, carbon black or magnetic material; and subjecting the mixture to melt kneading, cooling, pulverization and classification into an average particle size of 1-50$\mu$. It is required for the toner thus formed to satisfy various properties such as storage stability, durability, moisture resistance, electrostatic characteristic, fluidity, fixability, and image characteristic.

The production of a toner through the so-called pulverization process described above is accompanied with many advantages, and it is said that most of the commercially available dry toners are produced by the pulverization process. However, this process also involves some problems. The wind-force impingement-type pulverizer used in the essential part of the pulverization process requires a large quantity of compressed air. Therefore, a large amount of equipment cost is required and a large amount of electric power is required at the time of operation, so that the electric power cost occupies a substantial part of the toner processing cost. Recently, according to the requirement of a higher quality of copied images, a finer particle size of toner is required, but it is difficult to produce a small particle size toner at a high efficiency by the currently used pulverization process consuming a large amount of energy for pulverization. Even if it is applied, there results in a substantial increase in production cost. Further, when a small size toner is produced through the pulverization process, the pulverized product is liable to have a broad particle size distribution and is accompanied with a large amount of unnecessary ultrafine powder, which is generally extremely difficult to remove by classification. In order to effectively carry out the pulverization, the toner material is required to have an appropriate degree of fragility and the starting materials therefor are restricted from this point. When a soft starting material is used in order to improve the fixability, the sticking onto apparatus used in various steps is caused due to heat generated on pulverization and pressure for pulverization, so that a continuous operation for a long period becomes difficult.

In order to overcome these problems accompanying dry pulverization, the production of a toner through suspension polymerization has been proposed. However, the production of a dry toner through suspension polymerization proposed heretofore involves the following problems. In the production of a toner by an ordinary suspension polymerization process, it is very difficult to effectively control a particle size to a desired size in a granulation or particle (or more precisely droplet) formation step wherein a liquid monomer composition comprising a polymerizable monomer and a colorant. In the present state, the resultant particles have a broad particle size distribution and contain very large size particles, so that the proportion of particles within a proper size range is low and the productivity is poor. In the pulverization process, such particles removed through classification can be reused by mixing and kneading them with a starting material. It is however difficult at present to reuse polymer particles having inappropriate particle sizes produced in suspension polymerization. Accordingly, in order to solve the above problem, it is necessary to produce particles of a monomer composition capable of providing a toner having a finally desired particle size distribution stably and at a good yield in the granulation step. The conventional polymerization process involves many problems in this respect.

In the suspension polymerization process, principal steps are operated in a liquid medium (generally, water), and in the granulation step, a dispersion stabilizer is used in order to form particles of a monomer composition and stabilize the particles. As the dispersion stabilizer, a hardly water-soluble or substantially water-insoluble inorganic fine powder such as that of $BaSO_4$, $CaSO_4$, $CaCO_3$ and silica acid (silica); and a water-soluble polymer such as polyvinyl alcohol or gelatine or a water-soluble surfactant, may generally be used singly or in combination. Such a dispersion stabilizer has a strong affinity to water for its function. Therefore, if a dispersion stabilizer remains in a toner, the toner is caused to have a lowered development ability and a lowered transfer efficiency mainly because of decrease in chargeability. Especially, under a high humidity condition, there arises a deterioration of image quality due to decrease in copied image density, decrease in resolution, blurring and scattering. As a result, it is necessary to decrease the amount of a dispersion stabilizer while providing a smaller particle size and a sharp particle size distribution with a small amount of the dispersion stabilizer. It is known to change the kind of the dispersion stabilizer and to minimize the quantity thereof. However, if the amount of a dispersion stabilizer is decreased in a conventional dispersion system, the resultant particles of a monomer composition become coarse in size and have a broad distribution, so that secondary agglomeration of the particles frequently occurs and it becomes difficult to obtain an appropriate particle size. Thus becomes a more serious problem when a toner with a smaller particle size is required.

SUMMARY OF THE INVENTION

We have made an extensive study while noting the importance of the granulation step in order to solve the problems accompanying the toner production through suspension polymerization. As a result, we have arrived at the present invention relating to a process capable of producing a toner with an extremely good performance at a low cost, by introducing a novel granulation system comprising ejection into liquid in the granulation step.

More specifically, an object of the present invention is to provide a toner production process capable of efficiently producing a toner with an extremely narrow particle size distribution while easily controlling the average particle size, in production of a toner for developing electrostatic images through the suspension polymerization process.

Another object of the invention is to provide a process for effectively producing a dry toner with a small particle size.

Another object is to provide a process for producing a toner with a uniform and sharp particle size distribution by using a small amount of fine powdery dispersion stabilizer in toner production through suspension polymerization.

Another object is to provide a process for producing a toner which has good powder characteristic and also has good developing, transferring, fixing and cleaning characteristics.

Still another object is to provide a process for producing a toner at a low cost and a good productivity.

According to the present invention, there is provided a process for producing a toner for developing electrostatic latent images, comprising:

(a) preliminarily dispersing a monomer composition comprising at least a polymerizable monomer and a colorant in a liquid dispersion medium which is substantially mutually-insoluble with the monomer and contains a fine powdery dispersion stabilizer, thereby to form a liquid dispersion containing the preliminarily dispersed monomer composition;

(b) pressurizing the liquid dispersion up to a pressure of 10 kg/cm$^2$ or above;

(c) ejecting the dispersion into a low pressure section to form particles of the monomer composition; and (d) subjecting the particles of the monomer composition to suspension polymerization, thereby to produce toner particles.

DETAILED DESCRIPTION OF THE INVENTION

As an example of means for granulation or formation of particles (intended to cover droplets) used in the granulation step involving ejection or jetting into liquid in the production process according to the present invention, a piston-type high-pressure homogenizer manufactured by Gaulin Corp. may be raised. The high pressure homogenizer comprises a pressurizing mechanism for pressuring a process liquid, a valve mechanism for ejecting or jetting the pressurized process liquid, and an impacting mechanism for causing impringement of the ejected process liquid. We determined that the apparatus is applicable for forming particles or droplets with sizes on the order of microns in the presence of a solid powdery dispersant.

Figure 1:
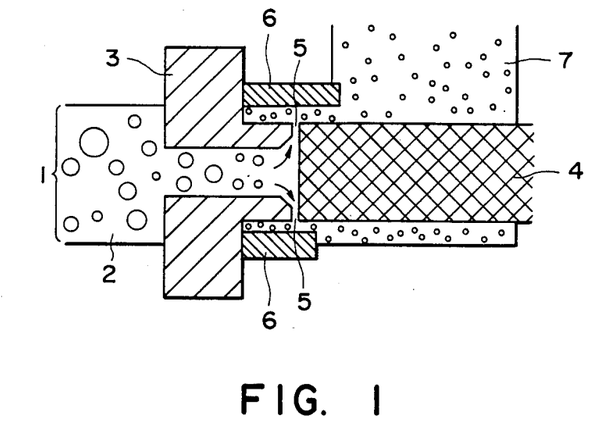
FIG. 1 is a sectional view illustrating a homogenizer which can be used in the granulation step according to the present invention.

The present invention will be explained with reference to an embodiment wherein a piston-type high pressure homogenizer is used as a granulation means while referring to FIG. 1. A monomer composition comprising a polymerizable monomer such as styrene, a colorant such as carbon black and a polymerization initiator is preliminarily dispersed for pregranulation in a liquid dispersion medium in the presence of a solid fine powdery dispersion stabilizer such as silica fine powder by a dispersion means such as a high shearing-force stirring-type mixer. The thus pre-granulated particles or droplets of the monomer composition maintain the particle state for a while even after the termination of stirring by stirring means, because the fine powdery dispersion stabilizer is present on the surface of the particles.

A liquid dispersion 1 containing the predispersed monomer composition is pressurized up to a prescribed pressure of 10 kg/cm$^2$ or above and is supplied to a high pressure section 2. In the above mentioned homogenizer, a volumetric plunger pump is used as a pressurizing means as it is excellent in metering characteristic and capable of arbitrarily adjusting the pressure. The pressurized dispersion 1 is jetted through a gap 5 between a valve sheet 3 and a valve 4 constituting a valve mechanism against an impact ring 6, which is an impacting, impinging a striking member, because of a pressure difference between the high pressure section 2 and a low pressure section 7 and is caused to impinge on the impact ring 6. As a result, the coarse particles of the monomer composition are converted into fine particles.

Further, agglomerates, of a fine powdery dispersion stabilizer which do not effectively function are further disintegrated to approach individual fine particles, so that the dispersion stabilization ability is increased as a whole. Thus, the fine particles of the monomer composition are protected by the fine powdery dispersion stabilizer with an enhanced stabilization function. As a result, even if the dispersed particles are further subjected to one or more times of additional pressurization and granulation when a sharp particle size is not obtained through a single granulation step, the possibility of further communication is much smaller than in the conventional granulation method.

In case of forming monomer composition particles with a particle size of 1–10µ, 2–10 cycles of the pressurization step and granulation step are generally conducted repeatedly while the number of cycles may charge depending on the viscosity of the monomer composition, the amount of the dispersion stabilizer, and the like.

Figure 2:
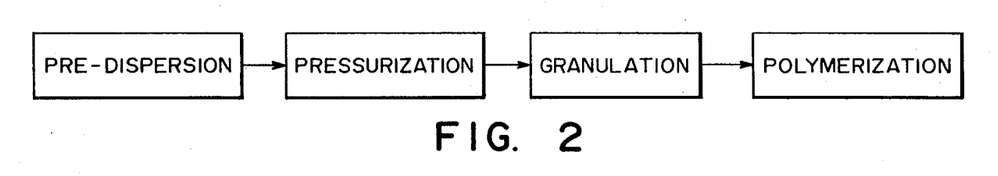
FIGS. 2 to 4 are flow charts each showing steps involved in an embodiment of the process according to the present invention.
Figure 3:
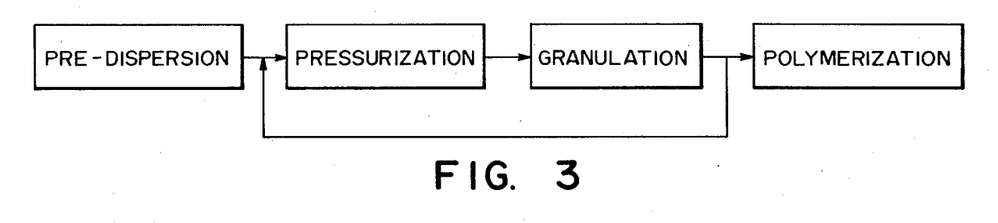
Figure 4:
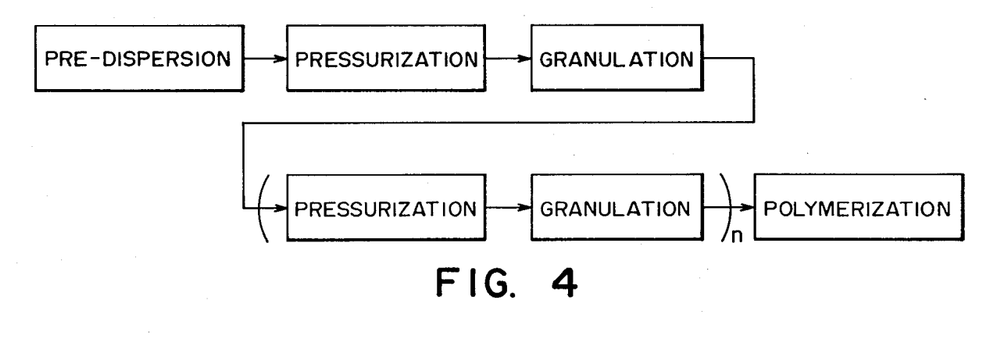

In the present invention, it is also possible to produce toner particles continuously through a preliminary dispersion step, a pressurization step, a granulation step and a polymerization step, as shown in FIG. 2. It is preferred, in order to obtain a sharp particle size distribution, that after the completion of the first cycle of the pressurization and granulation steps, the dispersion is continuously or intermittently recycled to repeat the pressurization and granulation steps as shown in FIG. 3. It is also possible to repeat the pressurization and granulation steps n times in series wherein n is generally 1 to 9.

The preliminary dispersion of a monomer composition into a liquid dispersion medium is effected by using a high shearing force mixer such as TK-homomixer. The preliminary dispersion may be conducted for 1 to 60 minutes. The monomer composition can contain a polymerization initiator already in this stage. Alternatively, after the granulation step, a polymerization initiator can be added into a liquid medium containing monomer composition particles adjusted to a polymerization temperature, thereby to effect suspension polymerization.

The liquid dispersion prepared in the preliminary dispersion step is pressurized to 10 kg/m$^2$ or above so as to be ejected into a low pressure section through a gap or nozzle to be dispersed into fine particles. Below 10 kg/cm$^2$, the pressure difference between the high pressure and low pressure sections is small, so that the ejection speed of the dispersion becomes insufficient and an effective granulation or dispersion effect cannot be attained. In order for the dispersion to be ejected at a high speed and impinge on an impacting member, it is preferred that the dispersion is pressurized to 100-700 kg/cm$^2$, particularly about 300-650 kg/cm$^2$ so as to provide a pressure difference between the high pressure and low pressure sections of about 100 kg/cm$^2$ or above, particularly about 300-650 kg/cm$^2$. The monomer composition in the dispersion jetted or ejected at a high speed may well be dispersed into a particle size of about 1-10$\mu$ under the adjusting action of the fine powdery dispersion stabilizer. In case where the size of the monomer composition particles in the dispersion after the granulation does not reach a prescribed weight-average particle size, the dispersion may be recycled to the pressuring step to be granulated again. The number of recycling (the number of passes) may preferably be 2-10. In case of the regranulation, coarse particles are converted into fine particles, and particles with a prescribed size are protected by the fine powdery dispersion stabilizer with an enhanced dispersion stabilization ability, so that a possibility of further reduction in size is very low and the resultant particle size distribution becomes very sharp.

The liquid temperature in the granulation step may be adjusted to such a temperature as to provide a viscosity of 1-1,000,000 cps, preferably 10-100,000 cps, of the monomer composition, so that the resultant monomer composition particles have a particle size of 1-10$\mu$ which provides a weight average particle size of 1-10$\mu$ of a toner for developing. As the liquid dispersion medium, water or an aqueous medium consisting predominantly of water is used, so that the temperature of the liquid dispersion may preferably be set to 20°-80° C., particularly 40°-70° C.

In the dispersion, the liquid dispersion medium may preferably be present in an amount of 100-5000 wt. parts, preferably 200-1000 wt. parts per 100 wt. parts of the monomer composition; and the fine powdery dispersion stabilizer may be used in an amount of 0.1-15 wt. %, preferably 1-10 wt. %, further preferably 3-8 wt. %, based on the liquid dispersion medium.

Compared with a case wherein a high shearing force stirrer frequently used heretofore for forming monomer composition particles, monomer composition particles with a uniform size of about 1-10$\mu$ in terms of a weight-average particle size can be formed by using a fine powdery dispersion stabilizer in an amount on the order of about ½-1/10 according to the present invention. It is also possible to effect the granulation in a shorter period than before.

The polymerizable monomer applicable to the present invention may be those having a reactive double bond such as $CH_2=C<$. Examples thereof include: styrene and its derivatives such as styrene, o-methylstyrene, m-methylstyrene, p-methylstyrene, p-methoxystyrene, p-phenylstyrene, p-chlorostyrene, 3,4-dichlorostyrene, p-ethylstyrene, 2,4-dimethylstyrene, p-n-butylstyrene, p-tert-butylstyrene, p-n-hexylstyrene, p-n-octylstyrene, p-n-nonylstyrene, p-n-decylstyrene, and p-n-dodecylstyrene; ethylene or monoolefins such as ethylene, propylene, butylene, and isobutylene; vinyl halides such as vinyl chloride, vinylidene chloride, vinyl bromide and vinyl fluoride; vinyl esters such as vinyl acetate, vinyl propionate, and vinyl benzoate; α-methylene aliphatic monocarboxylic acid esters such as methyl methacrylate, ethyl methacrylate, propyl methacrylate, n-butyl methacrylate, isobutyl methacrylate, n-octyl methacrylate, dodecyl methacrylate, 2-ethylhexyl methacrylate, stearyl methacrylate, and phenyl methacrylate; acrylic acid esters such as methyl acrylate, ethyl acrylate, n-butyl acrylate, isobutyl acrylate, propyl acrylate, n-octyl acrylate, dodecyl acrylate, 2-ethylhexyl acrylate, stearyl acrylate, 2-chloroethyl acrylate, and phenyl acrylate; maleic acid and maleic acid half esters; vinyl ethers such as vinyl methyl ether, vinyl ethyl ether, and vinyl isobutyl ether; vinyl ketones such as vinyl methyl ketone, vinyl hexyl ketone, and methyl isopropenyl ketone; N-vinyl compounds such as N-vinylpyrrole, N-vinylcarbazole, N-vinylindole, and N-vinylpyrrolidone; vinylnaphthalenes; derivatives of acrylic acid and methacrylic acids such as acrylonitrile, methacrylonitrile, and acrylamide. These monomers may be used either signly or in mixture of two or more species. Among these, it is preferred to use styrene or its derivative alone or in combination with another monomer in view of the developing characteristics and durability of the resultant toner.

In the monomer composition, it is preferred to incorporate a low-softening point compound having a releasing characteristic including waxes such as paraffin wax; and low-molecular weight polyolefins such as low-molecular weight polyethylene and low-molecular weight polypropylene in order to improve the fixability and anti-offset characteristic in the hot-roller fixation. In this case, the amount of addition thereof may be 1-300 wt. parts per 100 wt. parts of the polymerizable monomer.

Examples of the low softening point compound include paraffins, waxes, low-molecular weight polyolefins, modified waxes having aromatic group, natural waxes, long-chain carboxylic acids having a long hydrocarbon chain $-(CH_3-CH_2)_{11}$ or $-(CH_2)_{12}$ or longer aliphatic chains including 12 or more carbon atoms, and esters thereof. Different low-softening point compounds can be mixed. Examples of commercially available products include Paraffin Wax (Nihon Sekiyu K.K.), Paraffin Wax (Nihon Seiro K.K.), Microwax (Nihon Sekiyu K.K.), Microcrystalline Wax (Nihon Seiro K.K.), Hard Paraffin Wax (Nihon Seiro K.K.), PE-130 (Hoechst), Mitsui Hi-Wax 110P (Mitsui Sekiyu Kagaku K.K.), Mitsui Hi-Wax 220P (ditto), Mitsui Hi- Wax 660P (ditto), Mitsui Hi-Wax 320P (ditto), Mitsui Hi-Wax 410P (ditto), Mitsui Hi-Wax 420P (ditto), Hiletz T-100X (ditto), Hiletz T-200X (ditto), Hiletz T-300X (ditto), Petrosin 80 (ditto), Petrosin 100 (ditto), Petrosin 120 (ditto), Tack Ace A-100 (ditto), Tack Ace F-100 (ditto), Tack Ace B-60 (ditto), Modified Wax JC-2130 (ditto), Modified Wax JC-4020 (ditto), Modified Wax JC-1142 (ditto), Modified Wax JC-5020 (ditto); bees wax, carnauba wax, and montan wax.

In the polymerizable monomer composition, it is also possible to incorporate a crosslinking agent as exemplified below in order to produce a crosslinked polymer. Particularly, when no polymer, copolymer or cyclized rubber is added into the monomer composition, it is preferred to add a crosslinking agent in the monomer composition.

Examples of the crosslinking agent may appropriately include: divinylbenzene, divinylnaphthalene, divinyl ether, divinyl sulfone, diethylene glycol dimethacrylate, triethylene glycol dimethacrylate, ethylene glycol dimethacrylate, polyethylene glycol dimethacrylate, diethylene glycol diacrylate, triethylene glycol diacrylate, 1,3-butylene glycol dimethacrylate, 1,6-hexane glycol dimethacrylate, neopentyl glycol dimethacrylate, dipropylene glycol dimethacrylate, polypropylene glycol dimethacrylate, 2,2'-bis(4-methacryloxydiethoxyphenyl)propane, 2,2'-bis(4-acryloxydiethoxyphenyl)propane, trimethylolpropane trimethacrylate, trimethylolpropane triacrylate, tetramethylolmethane tetraacrylate, dibromoneopentyl glycol dimethacrylate, and diallyl phthalate.

If such a crosslinking agent is used in an excessive amount, the resultant toner particles lose fusibility to show a poor fixability. If the amount is too small, properties such as anti-offset characteristic, anti-blocking characteristic and durability become poor, so that it becomes difficult to prevent the offset phenomenon that, in hot-press roller fixation, a portion of a toner is not completely fixed onto paper but fixed onto a roller surface, and is then re-transferred onto a subsequent sheet of paper. For these reasons, the amount of use of the crosslinking agent may suitably be 0.001–15 wt. %, preferably 0.1–10 wt. %, of the polymerizable monomer.

The monomer composition contains a colorant. The colorant may comprise known dyes or pigments such as carbon black or grafted carbon black obtained by coating the surface of carbon black with a resin. The colorant may be contained in a proportion of 0.1–30 wt. % based on the amount of the polymerizable monomer. It is possible to add a charge controller or a fluidity improver as desired into the toner (internal addition). Such a charge controller or a fluidity improver can also be mixed with the toner particles (external addition). The charge controller may for example be a metal complex of an organic compound having a carboxyl group or a nitrogen-containing group, a metal-containing dye, or a nigrosine. The fluidity improver or a cleaning aid for the surface of a latent image-bearing member (photosensitive member) may for example be colloidal silica or an aliphatic acid metal salt. It is also possible to incorporate a filler such as calcium carbonate or fine powdery silica in an amount of 0.5–20 wt. % in the toner for the purpose of extension. Further, it is possible to add a fluidity improver such as polytetrafluoroethylene fine powder or zinc stearate powder in order to disintegrate the agglomerate of the toner particles and improve the fluidity.

In order to produce a magnetic polymerization toner, magnetic particles are added into the monomer composition. In this case, the magnetic particles also function as a colorant. The magnetic particles usable in the present invention may be a substance magnetizable when placed in a magnetic field, such as powder of a ferromagnetic metal such as iron, cobalt and nickel, or an alloy or compound thereof such as magnetite, hematite and ferrite. The magnetic particles may have a particle size of $0.05–5\mu$, preferably $0.1–1\mu$. In order to produce a small particle size toner, it is preferred to use magnetic particles of $0.8\mu$ or smaller. The content of the magnetic particles may suitably be 5–70 wt. %, preferably 10–60 wt. %, more preferably 20–50 wt. %, based on the weight of the monomer composition. It is possible that the magnetic particles have been treated with a treating agent such as silane coupling agent or titanate coupling agent or with an appropriate reactive resin. In this case, a treating amount of 5 wt. % or less, preferably 0.1–3 wt. %, may provide a sufficient dispersibility in the polymerizable monomer while not exerting a bad influence on the toner properties. It is also possible to use a mixture of lipophilic magnetic particles and hydrophilic magnetic particles.

According to our knowledge, when a water-soluble initiator is used, the resultant polymerization toner is caused to have a low moisture resistance, and suffers from degradation in developing characteristic and anti-blocking property under high temperature-high humidity conditions. For this reason, in order to produce a polymerization toner with excellent environmental characteristics, it is preferred to use a substantially water-insoluble polymerization initiator. More specifically, the substantially water-insoluble polymerization initiator preferably used in the present invention has a solubility of 1 g or less in 100 g of water, preferably 0.5 g or less in 100 g of water, particularly preferably 0.2 g or less in 100 g of water, respectively at room temperature. When the solubility is more than 1 g in 100 g of water, the decomposition product of the initiator remaining on the surfaces of the polymerization toner particles undesirably lowers the moisture resistance of the polymerization toner. The polymerization initiator used in the present invention is soluble in the polymerizable monomer and has a property of being well dissolved in the monomer in an ordinarily used range of amount (1–10 wt. parts per 100 wt. parts of the monomer). Examples of the polymerization initiator usable in the present invention may include: azo- or diazo-type polymerization initiators such as 2,2'-azobis-(2,4-dimethylvaleronitrile), 2,2'-azobisisobutyronitrile, 1,1'-azobis(cyclohexane-1-carbonitrile), 2,2'-azobis-4-methoxy-2,4-dimethylvaleronitrile, etc.; and peroxide-type polymerization initiators such as benzoyl peroxide, methyl ethyl ketone peroxide, isopropyl peroxycarbonate, cumene hydroperoxide, 2,4-dichlorobenzoyl peroxide and lauroyl peroxide. In the production process of the present invention, it is preferred that the polymerization initiator has a melting point equal to or lower than the polymerization temperature (generally, 50° C. or above). It is also preferred to use two or more polymerization initiators in mixture in order to control the molecular weight and molecular weight of the resultant polymer or in order to control the reaction time.

The amount of use of the polymerization initiator may be in the range of 0.1–20 wt. parts, preferably 1–10 wt. parts, per 100 wt. parts of the polymerizable monomer. Below 0.1 wt. part, it is difficult to distribute or provide the initiator evenly to individual monomer composition particles. Above 20 wt. parts is excessive to provide too low a molecular weight of the polymerization product and to increase the tendency that the polymerization occurs ununiformly.

The suspension polymerization is generally carried out at a polymerization temperature of 50° C. or higher, and the upper limit temperature may be set in consideration of the decomposition speed of the polymerization initiator. Too high a polymerization temperature is not desirable because the polymerization is decomposed too rapidly.

After it has been confirmed that the resultant particles of the monomer composition have a prescribed particle size, the temperature of the aqueous medium containing the particles is adjusted to a polymerization temperature (e.g. 55°–70° C.), thereby to cause suspension polymerization.

If a polar polymer (inclusive of copolymer) or cyclized rubber is added to a polymerizable monomer to be polymerized, a preferable polymerization toner having a pseudo-capsule structure can be obtained. The polar polymer or cyclic rubber may preferably be added in an amount of 0.5–50 wt. parts, preferably 1–40 wt. parts, per 100 wt. parts of the polymerizable monomer. Below 0.5 wt. part, it is difficult to obtain a desired pseudo-capsule structure. Above 50 wt. parts, there arises an increased tendency that the characteristics of the polymerization toner are lowered because the amount of the polymerizable monomer becomes insufficient. It is preferred that a polymerizable monomer composition containing the polar polymer or cyclized rubber thus added is suspended in an aqueous medium containing a dispersant dispersed therein having a chargeability to a polarity opposite to that of the polar polymer to be polymerized.

The cationic polymer (inclusive of copolymer), anionic polymer (inclusive of copolymer) or anionic cyclized rubber thus contained in the polymerizable monomer composition exerts an electrostatic force at the surface of toner-forming particles with the oppositely chargeable anionic or cationic dispersant dispersed in the aqueous medium, so that the dispersant covers the surface of the particles to prevent coalescence of the particles with each other and to stabilize the dispersion. In addition, as the added polar polymer or cyclized rubber gathers at the surface layer of the particles, a sort of shell is formed to provide the particles with a pseudo-capsule structure. The polar polymer or cyclized rubber of a relatively large molecular weight thus gathered at the particle surfaces envelopes a large amount of the low-softening point compound inside thereof to provide the polymerization toner particles of the present invention with excellent anti-blocking characteristic, developing characteristic and abrasion resistance. Examples of the polar polymer (inclusive of copolymer and cyclized rubber) and the fine powdery dispersant or dispersion stabilizer having a chargeability usable in the present invention may be raised hereinbelow. The polar polymer having a weight-average molecular weight of 5,000–500,000 as measured by GPC (gel permeation chromatography) is preferred because of good solubility in the polymerizable monomer and characteristic of providing a durable toner.

(a) Cationic polymers: polymers of nitrogen-containing monomers such as dimethylaminoethyl methacrylate and diethylaminoethyl acrylate; copolymers of styrene and such a nitrogen-containing monomer; and a ternary copolymer of styrene; an unsaturated carboxylic acid ester and such a nitrogen-containing monomer.

(b) Anionic polymers: polymers or copolymers of anionic monomers inclusive of nitrile monomers such as acrylonitrile, halogen-containing monomers such as vinyl chloride, unsaturated carboxylic acid such as acrylic acid, unsaturated dibasic acids, and unsaturated dibasic acid anhydrides; and copolymers of styrene and such as anionic monomer. Cyclized rubber may also be used as an anionic polymer.

The fine powdery dispersion stabilizer may preferably be hardly water-soluble or substantially water-insoluble inorganic fine powder capable of stabilizing the dispersion of the monomer composition particles in an aqueous medium. The amount of addition of the dispersant may preferably be 0.1–50 wt. %, particularly 1–20 wt. %, based on the water.

(c) Anionic dispersant: colloidal silica such as Aerosil #200, #300 (Nihon Aerosil K.K.), Nipsil E-220A (Nihon Silica); and Finesil T-32 (Tokuyama Soda K.K.)

(d) Cationic dispersant: aluminum oxide, magnesium hydroxide and hydrophilic positively chargeable silica fine powder such as aminoalkyl-modified colloidal silica obtained through treatment with a coupling agent.

In the process of the present invention, a fine powdery dispersion stabilizer is used, but it is not necessary required to use a polar polymer or a fine powdery dispersant having chargeability opposite thereto in a liquid medium.

It is possible to further add an appropriate dispersion stabilizer in the aqueous medium. Examples of such a dispersion stabilizer include polyvinyl alcohol, gelatin, methyl cellulose, methyl hydropropyl cellulose, ethyl cellulose, sodium carboxymethyl cellulose, polyacrylic acid and salts thereof, starch, gum alginic acid salts, zein, casein, tricalcium phosphate, talc, barium sulfate, bentonite, aluminum hydroxide, ferric hydroxide, titanium hydroxide and thorium hydroxide. One or more of these compounds may be added to the aqueous medium to such an extent that the process of the present invention is not adversely affected thereby.

In order to effect uniform dispersion of the inorganic dispersion stabilizer, it is possible to add a surfactant within an extent of not adversely affecting the process of the present invention. The surfactant is used to promote the above mentioned dispersion stabilizer to show the prescribed function. Specific examples of such a surfactant include: sodium dodecylbenzenesulfonate, sodium tetradecylsulfate, sodium pentadecylsulfate, sodium octylsulfate, sodium allyl-alkyl-polyethersulfonate, sodium oleate, sodium laurate, sodium caprate, sodium caproate, potassium stearate, calcium oleate, sodium 3,3-disulfonediphenylurea-4,4-diazo-bis-amino-8-naphthol-6-sulfonate, ortho-carboxybenzene-azo-dimethylaniline, sodium 2,2,5,5-tetramethyl-triphenylmethane-4,4- diazo-bis-$\beta$-naphthol-disulfonate, and others.

It is also possible to add a Broensted acid such as hydrochloric acid in order to enhance the ionization of the polar group of the polar polymer or cyclized rubber in the monomer composition. Particularly, the addition of a Broensted acid such as hydrochloric acid in the aqueous medium is effective in enhancing the effect of an anionic polymer (including copolymer) or cyclized rubber.

The polymerization toner according to the present invention is applicable to the known dry system methods for developing electrostatic images including the two-component developing methods such as the cascade method, the magnetic brush method, the microtoning method and the two-component AC bias developing method; the one-component developing methods using a magnetic toner such as the electroconductive one-component developing method, the insulating one-component developing method and the jumping developing method; the powder cloud method and the fur brush method; the nonmagnetic one-component developing method wherein the toner is carried on a toner-carrying member to be conveyed to a developing position and subjected to development thereat; and the electric field curtain method wherein the developer is conveyed by an electric field curtain to a developing position and subjected to development thereat. Thus, the polymerization toner of the present invention is especially suitably applicable to the developing method, wherein a small particle size toner having a weight-average molecular weight of about 2–8μ with a sharp particle size as a requisite is used.

Hereinbelow, the present invention will be described based on examples.

EXAMPLE 1

| | |
|---|---|
| Styrene monomer | 90 g |
| 2-Ethylhexyl methacrylate | 10 g |
| 2,2'-Azobis-(2,4-dimethylvaleronitrile) | 2 g |
| 2,2'-Azobisisobutyronitrile | 1 g |
| Cyclized rubber | 15 g |
| (Albex CK450, mfd. by Hoechst Japan, K.K.) | |
| Charge-controlling organometal complex | 2 g |
| (Bontron E81, mfd. by Orient Kagaku Kogyo K.K.) | |
| Carbon black | 12 g |
| (STERING R, mfd. by Cabot Co., U.S.A.) | |

The above ingredients were mixed at 30° C. by means of an attritor to prepare a monomer composition. The viscosity of the monomer composition at 60° C. was 300 cps. The thus obtained monomer composition was charged in a 2 l-stainless steel vessel which already contained 5 g of amino-modified silica (obtained by treating 100 wt. parts of Aerosil 200 with 5 wt. parts of aminopropyltriethoxysilane), 600 g of distilled water and 20 g of 0.1N-hydrochloric acid, and the mixture was stirred at 60° C. for 10 minutes by means of a TK-homomixer (mfd. by Tokushu Kika Kogyo K.K.) rotating at 10,000 rpm for preliminary dispersion, to prepare a liquid dispersion. The dispersion was then charged in an about 5 l-vessel and subjected to granulation by means of a piston-type high pressure homogenizer (Model 15M-8TA, mfd. by Gaulin Corp.) at an ejection pressure of 580 kg/cm². The effluent from the high-pressure homogenizer was recycled to the 5 l-vessel and the granulation operation was continued for about 4 minutes (about 5 passes (3.5 l in 4 min)). The dispersion was then subjected to stirring by means of a paddle blade stirrer for 10 hours at 60° C.

Thereafter, the dispersion was subjected to cooling, dehydration, washing with water, dehydration and drying to obtain a polymerization toner. The resultant toner showed a volume-average particle size of 4.9μ, and contained 5% by volume of fine particles with sizes below 2.52μ and 3% by volume of coarse particles with sizes over 8.0μ according the particle size measurement by means of a Coulter counter with an aperture of 100μ, thus showing a very narrow distribution.

15 grams of the resultant polymerization toner, 85 g of an insulating carrier (composed of magnetite and epoxy resin) having an average particle size of 50μ, 0.75 g of hydrophobic silica (Aerosil R972, mfd. by Nihon Aerosil K.K.) and 0.45 g of zinc stearate powder were mixed to prepare a developer, which was then evaluated with respect to the electrophotographic characteristics in the following manner.

Figure 5:
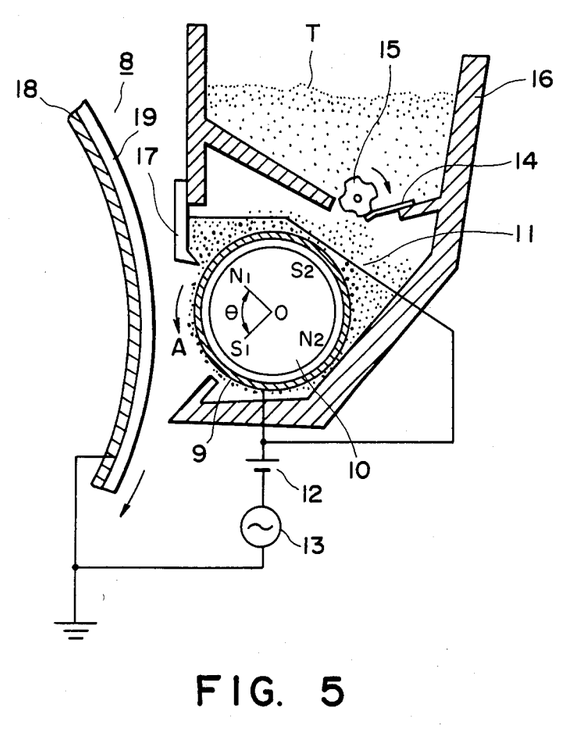
FIG. 5 is a schematic view illustrating a developing apparatus used for evaluating the electrophotographic characteristics of polymerization toners obtained in Examples of the present invention and Comparative Examples.

A developing apparatus as shown in the figure was used. An image-bearing member 8 has a selenium photosensitive member 19, which was rotated at a peripheral speed of 100 mm/sec, the maximum potential of an electrostatic image formed on the image bearing member was +750 V. Opposite the image-bearing member 8 was disposed a sleeve 9 having an outer diameter of 20 mm and rotated at a peripheral speed of 100 mm/sec. A magnetic flux of 1000 Gauss was exerted to the surface of the sleeve (developer-carrying member) 9 with a magnet roller 10 having poles of $N_1$, $N_2$, $S_1$ and $S_2$. Thus, a layer of the developer in a thickness of 200 μm was formed. The sleeve 9 and the image bearing member 8 were disposed at gap of 300 μm. The bias voltage applied to the sleeve comprised a DC component of +200 V, and an AC component of 3.0 KHz and 1400 Vpp. The electrostatic image was satisfactorily developed. The developed toner image was electrostatically transferred to plain paper, and fixed by passing through a hot roller fixing apparatus composed of a fixing roller surfaced with a silicone rubber layer and a pressure roller (nip width: 9 mm, paper moving speed of 300 mm/sec) under a pressure of 7 kg/cm² and at a fixing temperature of 150° C. The resultant fixed image was free of fog and showed an image density (Dmax) of 1.44.

More specifically, in the developing apparatus shown in the figure, a toner T mixed with an external additive was quantitatively supplied to a lower chamber by means of an elastic member 14 and a supply roller 15, and mixed with a carrier to form a developer 11. To the sleeve 9 having a magnet roller 10 therein and a doctor blade 17, a DC bias was supplied from a DC bias supply 12, and an AC bias was supplied from an AC bias supply. As the rotation of the sleeve 9 in the direction of A, the developer 11 was conveyed and supplied for development of an electrostatic latent image on the image-bearing member 8 comprising the aluminum cylinder 18 and the selenium photosensitive member 19. A developer regulating member 17 also functioned as an outer wall of the developing apparatus.

EXAMPLE 2

A polymerization toner was prepared in the same manner as in Example 1 except that the stirring by means of the TK homomixer was carried out for 60 minutes, and the injection pressure of the piston-type high-pressure homogenizer was changed to 400 kg/cm².

The resultant toner showed a volume-average particle size of 2.1μ, and contained 3% by volume of fine particles with sizes below 1.26μ and 3% by volume of coarse particles with sizes over 5.04μ according the particle size measurement by means of a Coulter counter with an aperture of 50μ, thus showing a very narrow distribution.

EXAMPLE 3

A polymerization toner was prepared in the same manner as in Example 1 except that the amount of the amino-modified silica was charged to 1 g and the ejection pressure of the piston-type homogenizer was changed to 200 kg/cm². The resultant toner showed a volume-average particle size of 9.3μ, and contained 5% by volume of fine particles with sizes of below 5.04μ and 5% by volume of coarse particles with sizes of over 16μ.

COMPARATIVE EXAMPLE 1

A polymerization toner was prepared in the same manner as in Example 1 except that the amount of the amino-modified silica was charged to 10 g and the granulation through dispersion was conducted by using only the TK-homomixer for 60 minutes without using the high-pressure homogenizer. The resultant toner showed a volume-average particle size of 11.0μ, and contained 15% by volume of fine particles with sizes of below 6.35μ and 15% by volume of coarse particles with sizes of over 16μ, thus showing a broader particle size distribution.

A developer was prepared and evaluated with respect to the electrophotographic characteristics in the same manner as in Example 1 except that the above toner was used. The resultant image was accompanied with more fog than in Example 1 and showed a somewhat lower image density of 1.30.

Comparative Example 2

A polymerization toner was prepared in the same manner as in Example 1 except that the amount of the amino-modified silica was charged to 25 g and the granulation through dispersion was conducted by using only the TK-homomixer for 60 minutes without using the high-pressure homogenizer. The resultant toner showed a volume-average particle size of 5.1μ, and contained 20% by volume of fine particles with sizes of below 2.52μ and 15% by volume of coarse particles with sizes of over 8μ, thus showing a broader particle size distribution.

COMPARATIVE EXAMPLE 3

Example 1 was repeated except that the ejection pressure of the high-pressure homogenizer was charged to 8 kg/cm², whereby the granulation efficiency was extremely low.

What is claimed is:

1. A process for producing a toner for developing electrostatic latent images, comprising
   (a) preliminarily dispersing a monomer composition comprising at least a polymerizable monomer and a colorant in a liquid dispersion medium which is substantially mutually-insoluble with the monomer and contains a fine powdery dispersion stabilizer, thereby to form a liquid dispersion containing the preliminarily dispersed monomer composition;
   (b) pressurizing the liquid dispersion up to a pressure of 10 kg/cm² or above;
   (c) ejecting the dispersion into a low pressure section to form particles of the monomer composition; and
   (d) subjecting the particles of the monomer composition to suspension polymerization, thereby to produce toner particles.

2. A process according to claim 1, wherein the dispersion is pressurized to 100–700 kg/cm².

3. A process according to claim 1, wherein the dispersion is pressurized to 300–650 kg/cm².

4. A process according to claim 1, wherein the monomer composition and the fine powdery dispersion stabilizer are preliminarily dispersed in the liquid dispersion medium by means of a high-shearing force stirrer.

5. A process according to claim 4, wherein the preliminary dispersion is carried out for 1–60 minutes.

6. A process according to claim 1, wherein the liquid dispersion medium is used in a proportion of 100 to 5000 wt. parts per 100 parts of the monomer composition.

7. A process according to claim 6, wherein the liquid dispersion medium is used in a proportion of 200 to 1000 wt. parts of the monomer composition.

8. A process according to claim 1, wherein the fine powdery dispersion stabilizer is contained in the liquid dispersion medium in a proportion of 0.1–15 wt. % of the liquid dispersion medium.

9. A process according to claim 8, wherein the fine powdery dispersion stabilizer is contained in the liquid dispersion medium in a proportion of 1–10 wt. % of the liquid dispersion medium.

10. A process according to claim 1, wherein the liquid dispersion is held at a temperature of 20°–80° C. in the step (c).

11. A process according to claim 10, wherein the liquid dispersion is held at 40°–70° C. in step (c).

12. A process according to claim 1, wherein the polymerizable monomer is a monomer having a $CH_2=C<$ group.

13. A process according to claim 1, wherein the monomer composition already contains a polymerization initiator in the step (a).

14. A process according to claim 1, wherein a polymerization initiator is added to the particles of the monomer composition after the step (c).

15. A process according to claim 1, wherein the monomer composition contains a polar polymer or cyclized rubber.

16. A process according to claim 1, wherein the monomer composition contains a crosslinking agent.

17. A process according to claim 1, wherein the monomer composition contains a low-softening point compound.

18. A process according to claim 1, wherein the monomer composition contains a colorant in a proportion of 0.1 to 30 wt. % of the polymerizable monomer.

19. A process according to claim 18, wherein the colorant is carbon black.

20. A process according to claim 1, wherein the monomer composition contains 5–70 wt. % of magnetic particles.

21. A process according to claim 20, wherein the monomer composition contains 10–60 wt. % of magnetic particles.

22. A process according to claim 1, wherein the monomer composition is a monomer having $CH_2=C<$ group; the monomer composition containing the monomer is preliminarily dispersed in an aqueous medium containing the fine powdery dispersion stabilizer; and the liquid dispersion containing the preliminarily dispersed monomer composition is pressurized to 100–700 kg/cm².

23. A process according to claim 22, wherein the monomer composition contains carbon black in a proportion of 0.1–30 wt. % based on the polymerizable monomer.

24. A process according to claim 22, wherein the liquid dispersion is held at a temperature of 40°–70° C. in the step (c).

* * * * *

UNITED STATES PATENT AND TRADEMARK OFFICE
CERTIFICATE OF CORRECTION

PATENT NO. : 4,702,988
DATED : October 27, 1987
INVENTOR(S) : HIROSHI FUKUMOTO, ET AL.

It is certified that error appears in the above-identified patent and that said Letters Patent is hereby corrected as shown below:

COLUMN 1

Line 63, delete "in".

COLUMN 2

Line 68, "Thus" should read --This--.

COLUMN 4

Line 4, "raised." should read --used.--.
   Line 8, "impringement" should read --impingement--.
   Line 60, "charge" should read --change--.

COLUMN 5

Line 19, "10 kg/m$^2$" should read --10 kg/cm$^2$--.

COLUMN 6

Line 40, "signly" should read --singly--.
   Line 59, "chain$(CH_3-CH_2)_{11}$" should read
          --chain $(CH_3(CH_2)_{11}$--.

COLUMN 9

Line 51, "envelopes" should read --envelops--.
   Line 59, "raised" should read --given--.

UNITED STATES PATENT AND TRADEMARK OFFICE
CERTIFICATE OF CORRECTION

PATENT NO. : 4,702,988

DATED : October 27, 1987

INVENTOR(S) : HIROSHI FUKUMOTO, ET AL.

It is certified that error appears in the above-identified patent and that said Letters Patent is hereby corrected as shown below:

COLUMN 10

Line 26, "necessary" should read --necessarily--.
Line 56, "4-   diazo-" should read --4-diazo---.

COLUMN 11

Line 63, "8.0µaccording the" should read
--8.0µ according to the--.

COLUMN 12

Line 67, "charged" should read --changed--.

COLUMN 13

Line 10, "charged" should read --changed--.
Line 29, "charged" should read --changed--.
Line 42, "charged" should read --changed--.
Line 47, "comprising" should read --comprising:--.

UNITED STATES PATENT AND TRADEMARK OFFICE
CERTIFICATE OF CORRECTION

PATENT NO. : 4,702,988            Page 3 of 3

DATED : October 27, 1987

INVENTOR(S) : HIROSHI FUKUMOTO, ET AL.

It is certified that error appears in the above-identified patent and that said Letters Patent is hereby corrected as shown below:

<u>COLUMN 14</u>

Line 10, "parts of" should read --parts per 100 parts of--.

Signed and Sealed this

Third Day of May, 1988

Attest:

DONALD J. QUIGG

*Attesting Officer*      *Commissioner of Patents and Trademarks*